March 8, 1932. H. A. FINK ET AL 1,848,827
AUTOMATIC CONTROL MECHANISM FOR CAN MACHINERY
Filed May 24, 1930 7 Sheets-Sheet 1
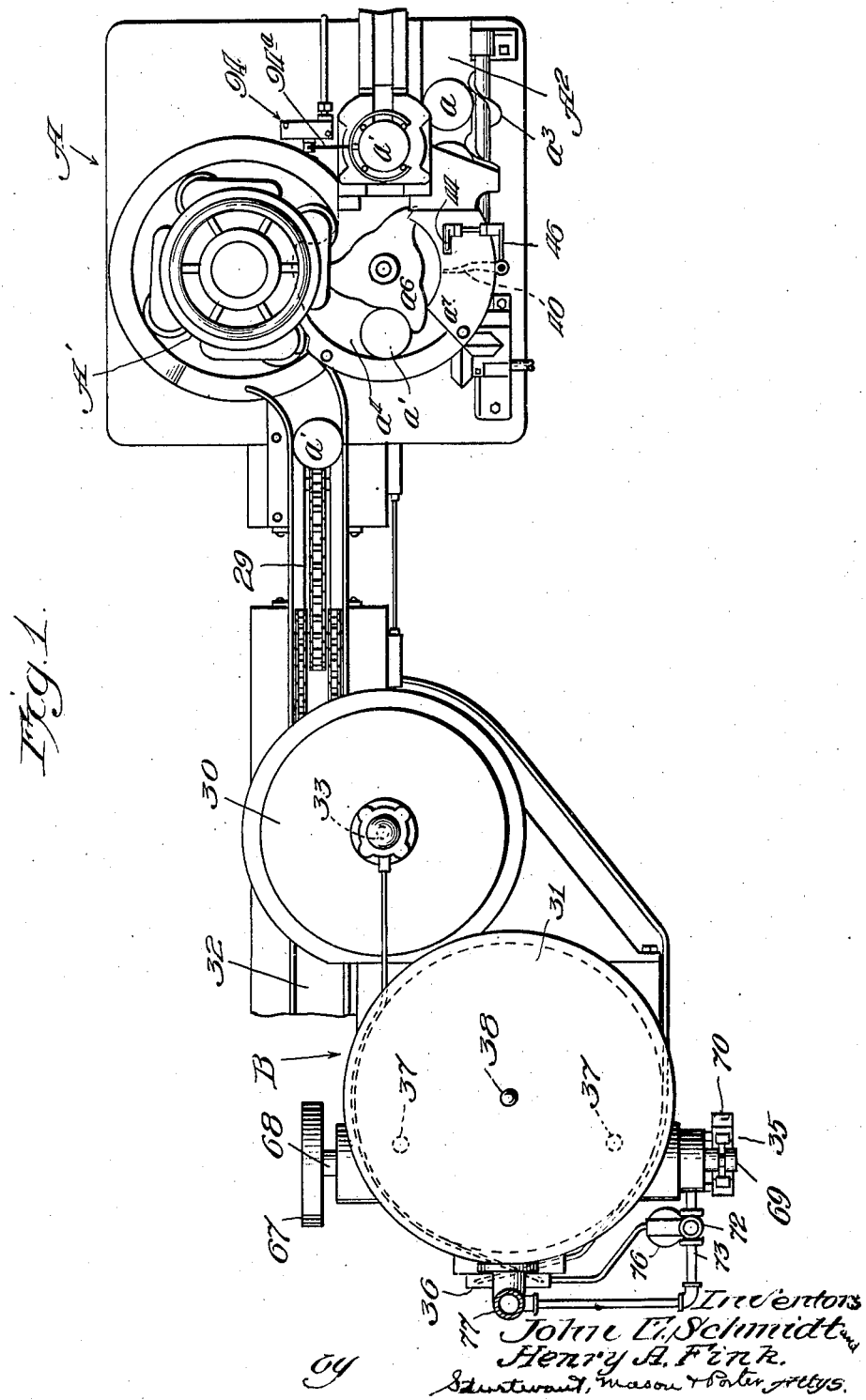

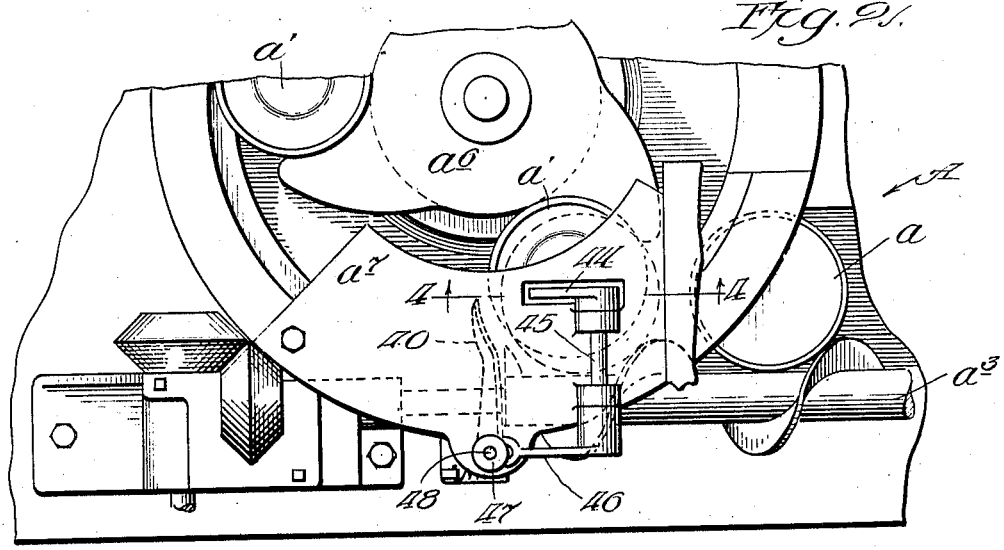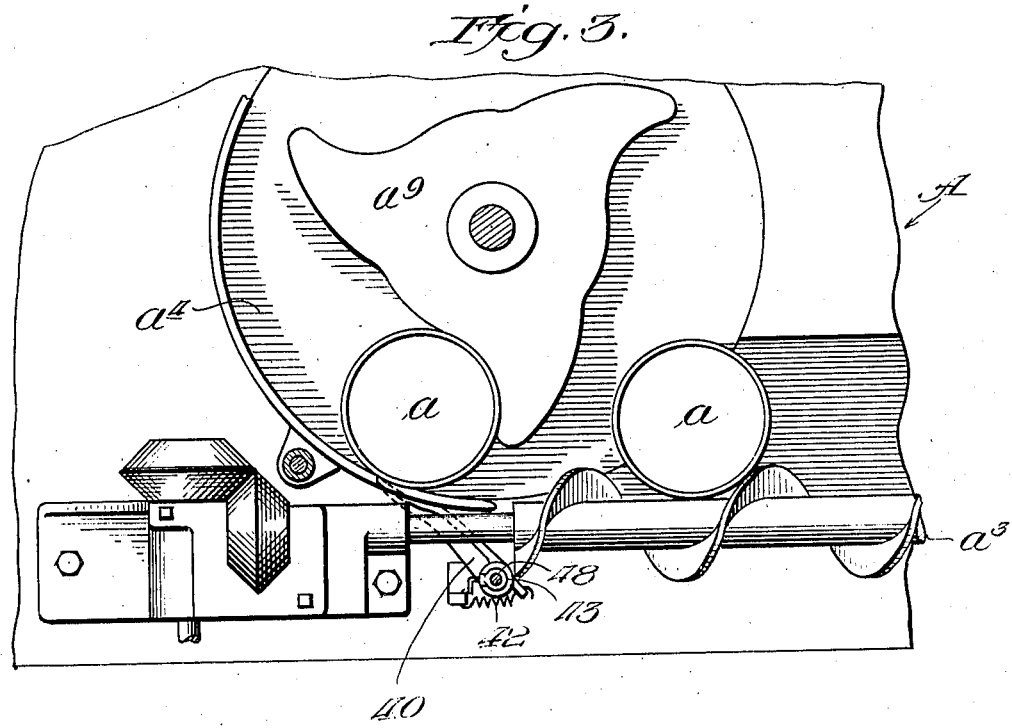

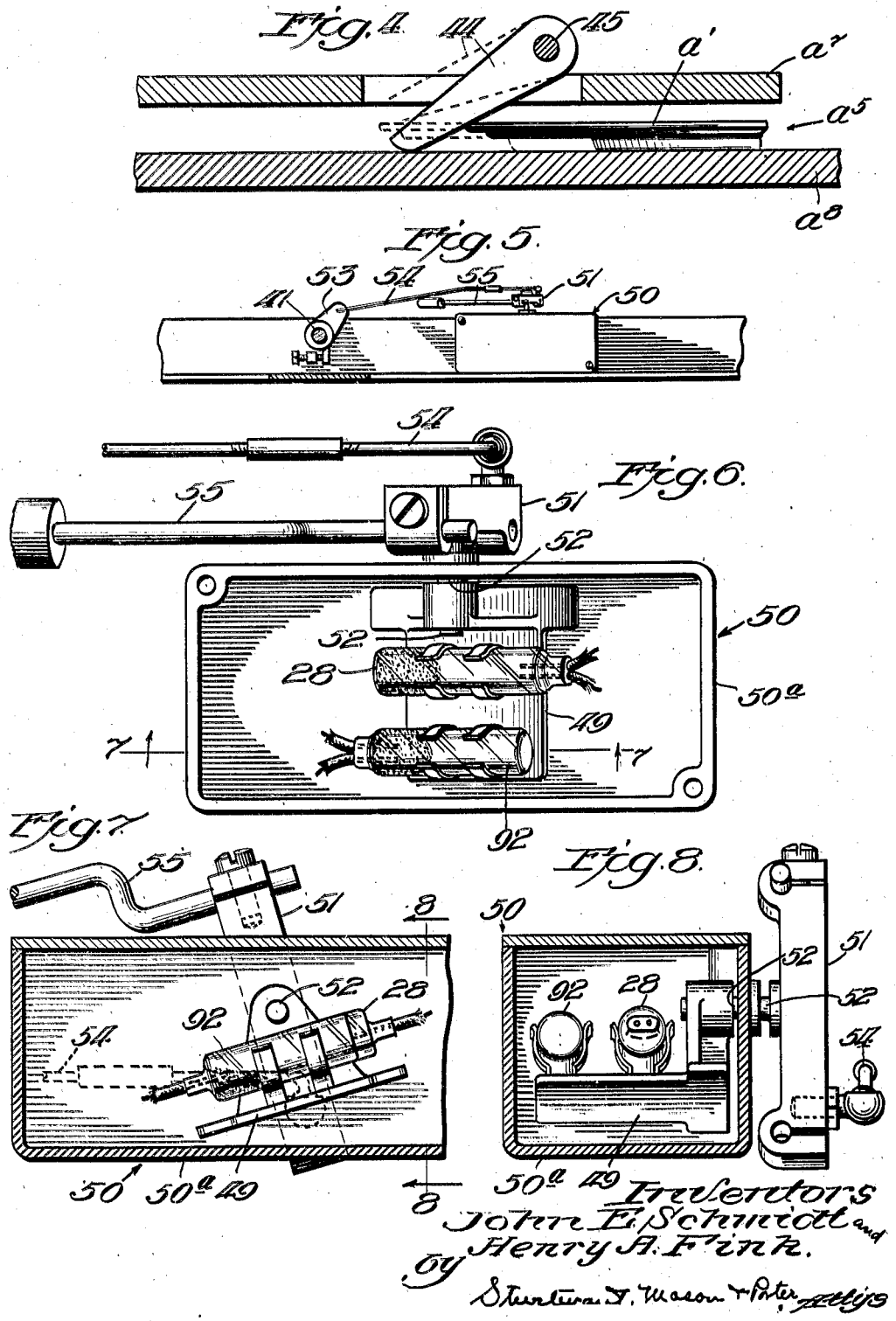

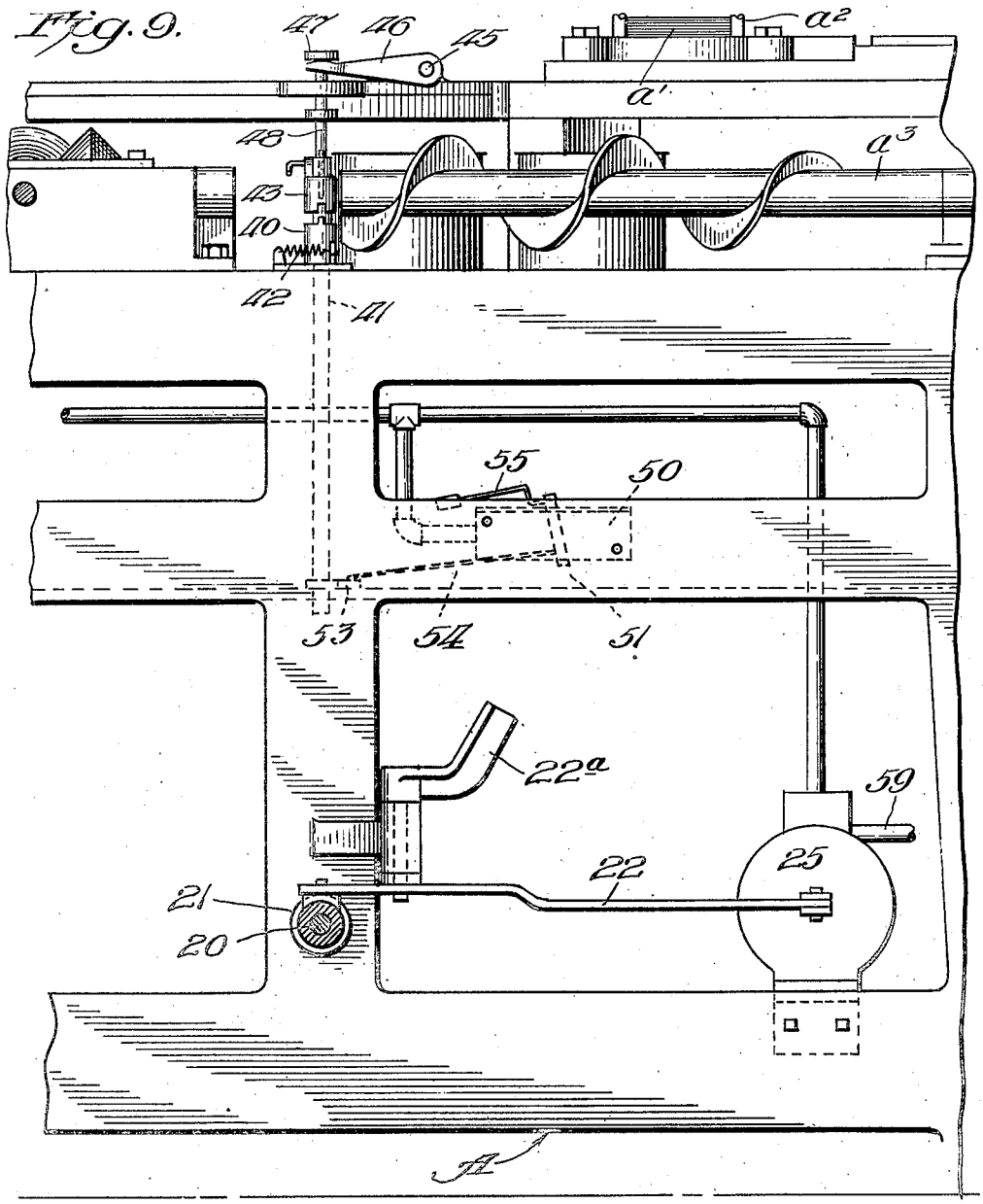

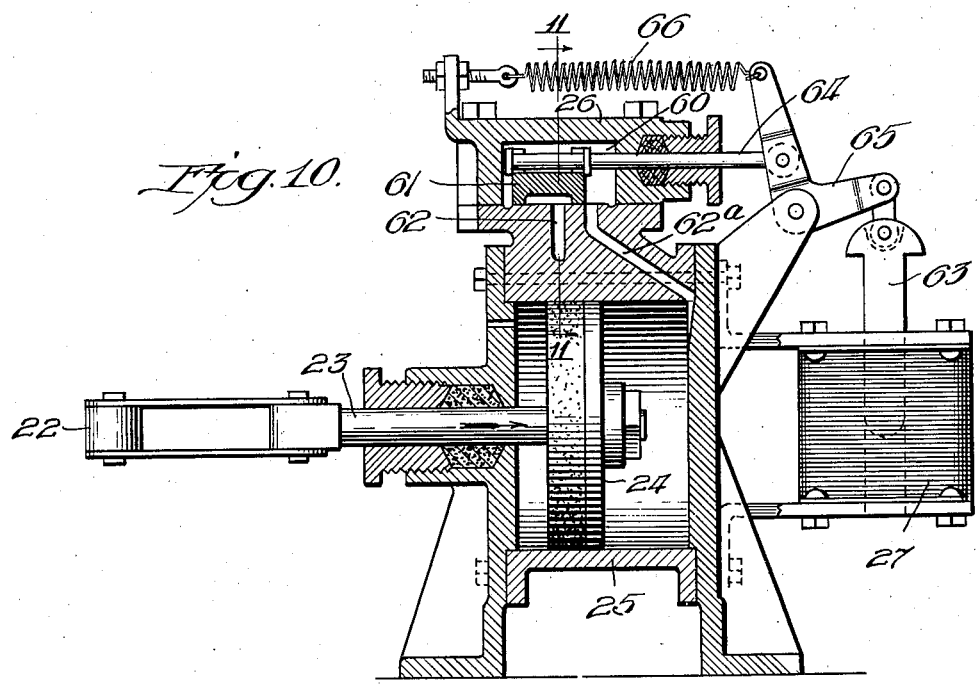
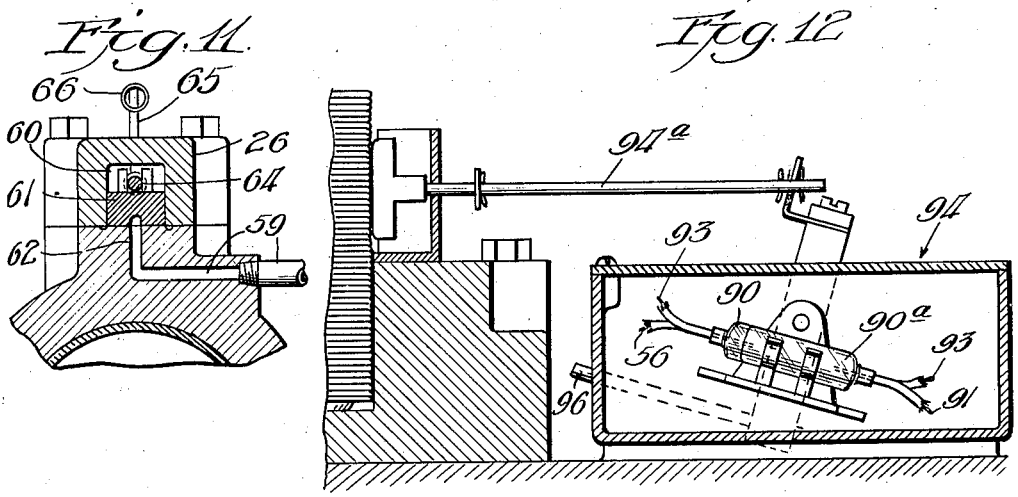

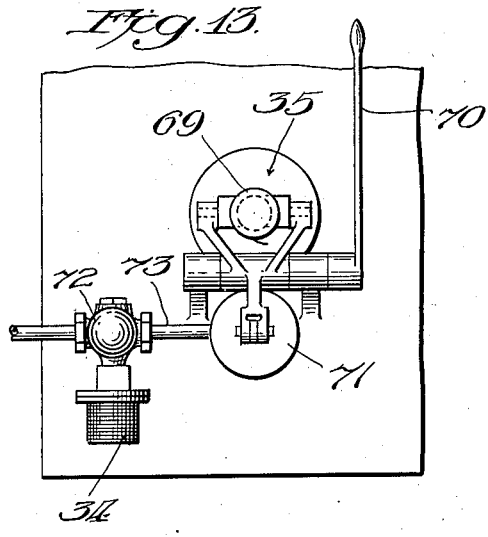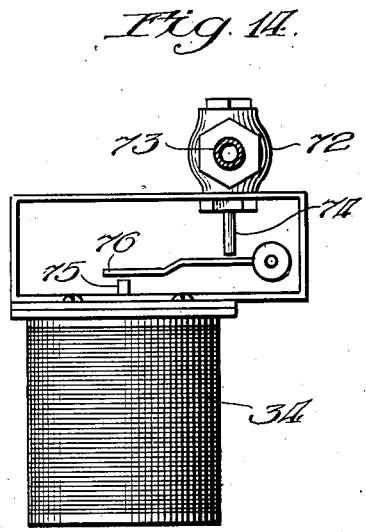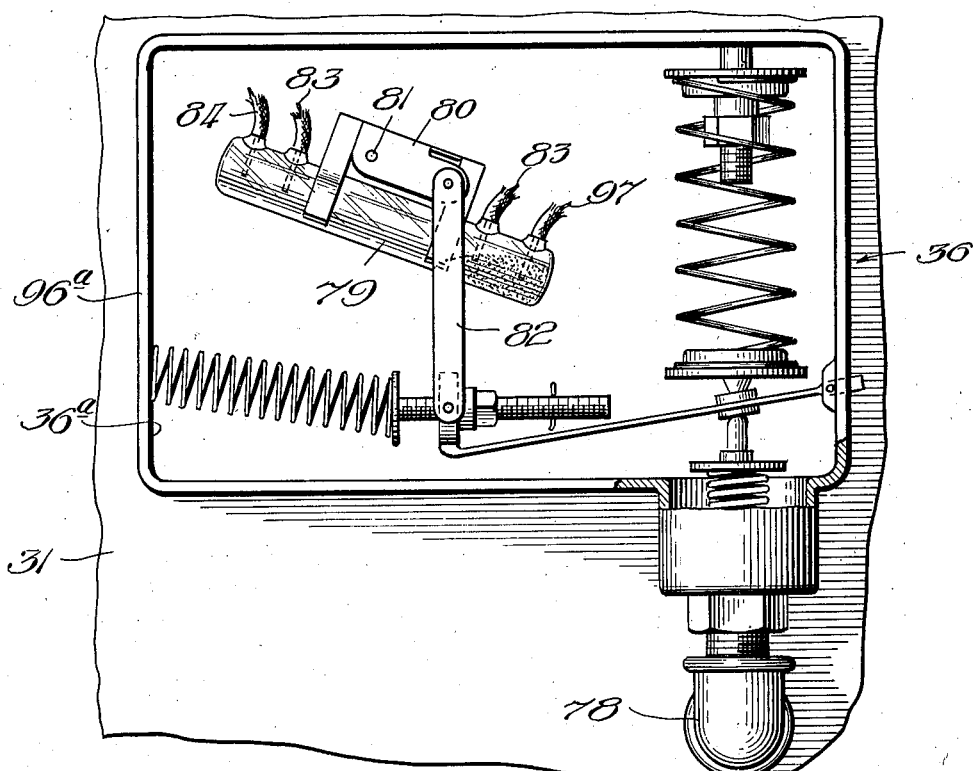

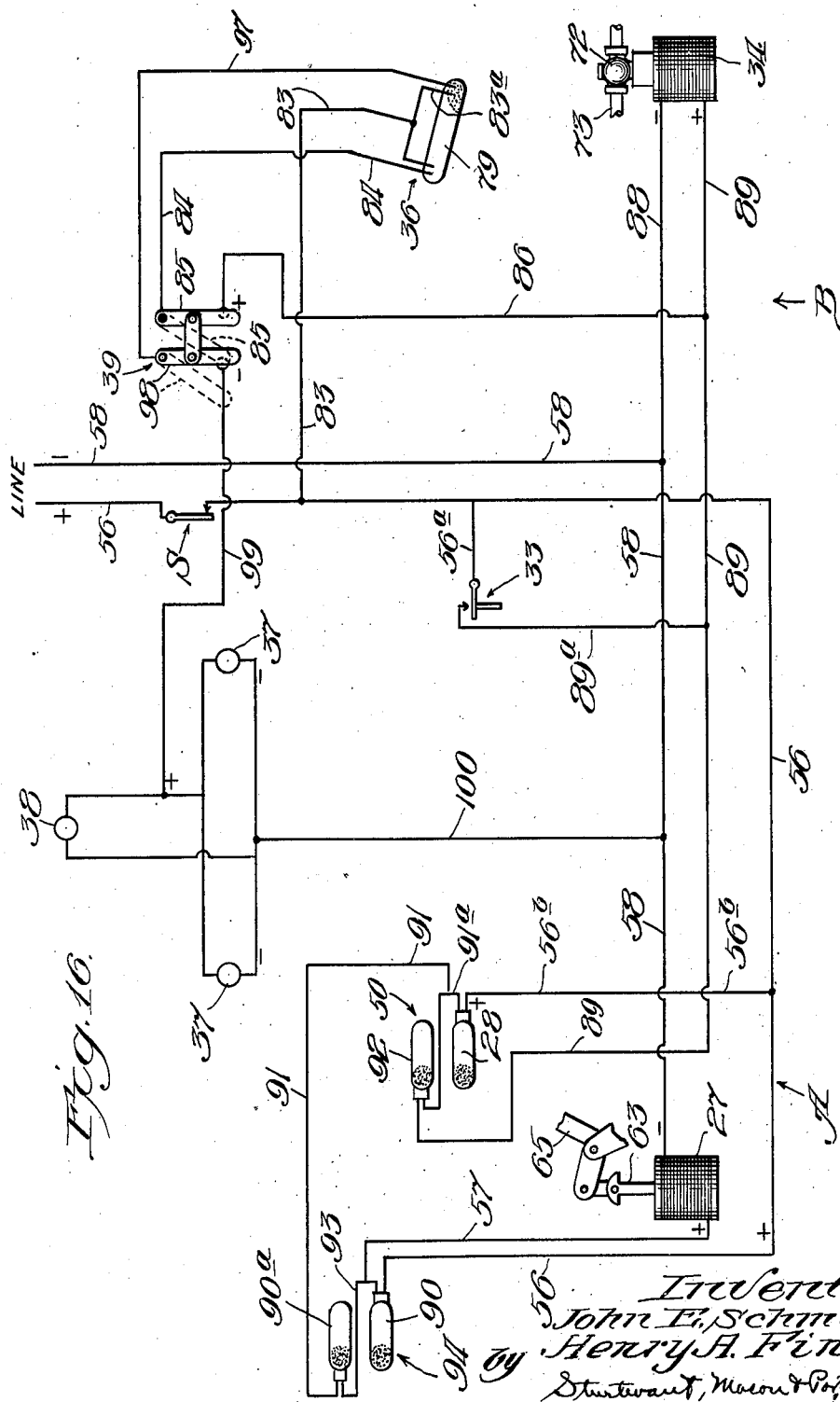

Patented Mar. 8, 1932

1,848,827

UNITED STATES PATENT OFFICE

HENRY A. FINK, OF NEW YORK, N. Y., AND JOHN E. SCHMIDT, OF CHICAGO, ILLINOIS, ASSIGNORS TO CONTINENTAL CAN COMPANY, INC., OF NEW YORK, N. Y., A CORPORATION OF NEW YORK

AUTOMATIC CONTROL MECHANISM FOR CAN MACHINERY

Application filed May 24, 1930. Serial No. 455,431.

This invention relates to automatic control mechanism for can machinery, and its principal object is the provision of novel automatic mechanism (preferably electrically operated) for stopping one or both of two associated machines in case of a mal-operation occurring in either machine.

With many types of can machinery, an automatic machine is employed for placing the can tops on filled can bodies and partially securing the tops to the bodies, after which the cans are fed therefrom into a closing machine where the tops are permanently secured to the bodies. For purposes of illustration, the machine shown for assembling the can tops with the filled can bodies is of the type known as a "clinching machine", and the machine illustrated for closing the cans is of the type known as a "vacuumizing and seaming machine".

Occasionally a filled can passes through the clinching machine without receiving a can top, and unless the clinching machine is immediately stopped, the can would be fed into the vacuumizing and seaming machine where the contents of the can is likely to become spilled and other difficulties encountered. An object of the present invention is the provision of automatic means associated with the clinching machine operating to stop the clinching machine without stopping the vacuumizing and seaming machine in case a can passes through the clinching machine without receiving a can top.

Occasionally some mal-operation takes place in the vacuumizing and seaming machine which requires that both machines be stopped immediately to permit restoration of the vacuumizing and seaming machine into working condition, and an object of the present invention is to provide automatically acting means operating in response to such mal-operations for stopping the vacuumizing and seaming machine and also the clinching machine so as to prevent other filled cans from being fed to the vacuumizing and seaming machine. Sometimes the vacuum in the vacuumizing and seaming machine is reduced below that required for effective operation, and, in such case, it becomes necessary to stop the machine, and an object of the invention is the provision of automatic control mechanism operating in response to failure or partial failure of the vacuum for stopping both machines.

With these and other objects and advantages in view, this invention consists in automatic control mechanism having means responsive to mal-operations occurring in the clinching machine for stopping said machine. It further consists in control mechanism responsive to mal-operations in a closing machine associated with a clinching machine and having means responsive to mal-operations of the closing machine for stopping the closing machine and the clinching machine. It further consists in control mechanism for stopping both machines made responsive to failure of the vacuum in the closing machine.

It further consists in electrically operated automatic control means for a clinching and an associated closing machine operating to stop the clinching machine without stopping the closing machine in case a filled can unprovided with a cover is discharged from the clinching machine. It further consists in electrically operated automatic control means for associated clinching and closing machines for stopping both of said machines in case of a mal-operation of the closing machine or in case the vacuum therein fails.

It further consists in the several novel features of construction, arrangement and combination of parts hereinafter fully set forth.

The invention is clearly illustrated in the drawings accompanying this specification in which—

Figure 1 is a plan of a clinching machine and an associated vacuumizing and seaming machine stripped of much of their mechanisms, and equipped with control mechanism embodying a simple form of the present invention;

Fig. 2 is a fragmentary plan of certain can top propelling mechanism of the clinching machine, and illustrating certain switch actuating members of the control mechanism;

Fig. 3 is a fragmentary plan of certain can propelling mechanism of the clinching machine, and illustrating certain parts of the switch actuating members;

Fig. 4 is a detail vertical fragmentary section illustrating a certain finger that forms part of the switch actuating members of the stopping mechanism for the clinching machine;

Fig. 5 is a detail view, partly in plan and partly in horizontal section, of certain members of the switch actuating mechanism for the clinching machine;

Fig. 6 is a plan of the switch which controls the circuits for the stopping mechanism of the clinching machine;

Fig. 7 is a fragmentary vertical longitudinal section taken on the line 7—7 of Fig. 6;

Fig. 8 is a detail vertical cross section taken on the line 8—8 of Fig. 7;

Fig. 9 is a side elevation of a fragment of the clinching machine, illustrating certain members of the switch actuating mechanism and the clutch operating mechanism;

Fig. 10 is a detail vertical longitudinal section taken through the pneumatic cylinder of the clutch operating mechanism of the clinching machine;

Fig. 11 is a detail cross section taken on the line 11—11 of Fig. 10;

Fig. 12 is a detail view, partly in side elevation and partly in section, of a switch employed for stopping the clinching mechanism in case its supply of can ends is about exhausted;

Fig. 13 is a side elevation of the clutch actuating mechanism for the vacuumizing and seaming machine;

Fig. 14 is a side elevation of the valve operating mechanism for the clutch mechanism seen in Fig. 13;

Fig. 15 is a side elevation, partly broken out, of a certain vacuum switch for controlling the circuits of the stopping mechanism for both machines and for controlling certain lighting circuits for the vacuumizing and seaming machine; and Fig. 16 is a diagrammatic view illustrating the circuits of the control mechanism for both machines.

In order that the various details of the control mechanism may be more readily understood, I shall first describe the general construction and operation of the machines and the control mechanism therefor.

Referring to said drawings, the reference character A (see Fig. 1) designates a clinching machine of well known construction, through which filled cans $a$ are moved during their passage to the closing machine B, which machine may be in the form of a vacuumizing and seaming machine, in which a partial vacuum is created in the cans while the ends are being seamed to the can bodies by suitable seaming mechanism, as is well understood. The can ends $a'$ for the cans are arranged in a stack (see Figs. 1 and 9) contained in a stackholder $a^1$ from which they are fed to the open upper ends of the filled cans, after which the can ends are clinched upon the cans by suitable clinching mechanism A'.

The can ends are brought over the filled cans at the place shown in Fig. 2, and when a can passes this point with a can end disposed above it, the clinching machine is permitted to continue its operation; but, in case a can end has not been fed to the can and the can passes this point, certain electric switch operating mechanism is actuated by the can in passing by certain members of said mechanism, and, as a result, an electric switch 50 is closed, whereby a solenoid 27 is energized and the clutch operating mechanism of the clinching machine is actuated and the clutch lever thrown to stop the machine.

The covered cans are discharged from the clinching machine and conveyed to the vacuumizing and seaming machine B by a conveyor 29 (see Fig. 1) and enter a chamber 30 from which they are carried into a vacuum chamber 31 in which the can ends are seamed to the can bodies and returned to the chamber 30 from which they are discharged upon a platform 32. In the chamber 30 is an electric switch 33 (see Fig. 16) which is contained in a circuit for a solenoid 34 associated with the clutch mechanism 35 (see Fig. 13) of the vacuumizing and seaming machine. Said switch 33 also controls a circuit for the solenoid 27 of the clutch throwing mechanism of the clinching machine. The switch 33 operates to close the circuits for both solenoids 27 and 34 whenever a maloperation takes place in the chamber 30 of the vacuumizing and seaming machine, thereby stopping both machines.

The vacuum chamber 31 of the vacuumizing and seaming machine is connected with a vacuum switch 36 (see Fig. 15) which is arranged in series with the solenoids 27 and 34 and operates to close the circuits through said solenoids whenever the vacuum in the vacuum chamber of the vacuumizing and seaming machine becomes inefficient for the purpose intended, thereby stopping both machines.

Incandescent electric lamps 37 (see Fig. 16) are contained in the vacuum chamber 31 of the vacuumizing and seaming machine for illuminating the interior thereof, and a signal lamp 38 may be provided on the exterior of the vacuum chamber 31, if desired. Said lamps are contained in an electric circuit controlled by the vacuum switch 36 and by a manually operated double throw switch 39 (see Fig. 16). While the vacuumizing and seaming machine is in operation, these lamps remain illuminated, but in case the vacuum fails the current is automatically shut off and the lights extinguished, thereby indicating failure of the vacuum.

It will thus be seen that although the clinching machine may be stopped by the automatic stopping mechanism thereof, the vacuumizing and closing machine will continue to operate upon the covered cans which have been fed thereto. It will also be understood in case of a mal-operation in the vacuumizing and seaming machine, or in case the vacuum fails therein, both machines will be stopped.

I will now describe more specifically the details of construction and arrangement of the control mechanism. Referring to Figs. 2, 3 and 9, an arm 40 will be seen which lies in the path of travel taken by the cans $a$ past the point shown in Figs. 2 and 3. The filled can bodies are delivered to the clinching machine and enter a guideway $A^2$ (see Fig. 1) at the receiving end of the machine, through which they are propelled by a worm screw or other conveyor $a^3$ to a turntable $a^4$ above which is a star wheel $a^9$ which moves them to the clinching mechanism $A'$ of the machine. The can ends are fed into an arcuate guideway $a^5$ (see Fig. 4) by a star wheel $a^6$. The guideway $a^5$ is formed between two plates $a^7$ and $a^8$ supported by the frame of the machine. When the can ends leave the guideway $a^5$ they lodge upon the can bodies and are carried therewith to the clinching mechanism $A'$.

The arm 40 is loosely mounted upon an upright rock shaft 41 journaled in the frame of the clinching machine and is connected at its lower end with the electric switch 50 which controls the stopping mechanism for the clinching machine, as will be hereinafter explained. The arm 40 is swung from the position seen in Fig. 2 to that seen in Fig. 3 by the cams $a$ as they pass by the arm and is returned to the position seen in Fig. 2 by a spring 42.

Slidably mounted on the rock shaft 41, but keyed or otherwise non-rotatably secured thereto, is a clutch collar 43 (see Fig. 9) which co-operates with the hub of the arm 40 to clutch said arm to the rock shaft 41 whenever the clutch collar 43 is lowered into engagement with the hub of said arm 40. As shown in Fig. 9, the hub of the arm 40 and the clutch collar 43 are provided with coacting clutch teeth which, when in engagement, form a clutch connection between the arm 40 and rock shaft 41.

Normally the clutch collar 43 and arm 40 are clutched together, but whenever a can end $a'$ is fed over a can at the place indicated in Figs. 2 and 3, the clutch collar 43 is unclutched from the arm 40, thereby permitting the arm 40 to be swung back idly by a can $a$ passing the same. To accomplish this end, a finger 44 is provided (see also Fig. 4), the free end of which extends into the guideway $a^5$ and lies in the path of movement taken by the can ends $a'$ as they move past the place shown in Figs. 2 and 3. The finger 44 is rigidly mounted on a shaft 45 which carries a forked arm 46 upon one end that engages with the head 47 of a stem 48 which projects up from the clutch collar 43. The arrangement of the parts described is such that normally the finger 44, forked arm 46, stem 48 and clutch collar 43 occupy a lower position with the clutch collar 43 clutched to the arm 40, so that in case the arm 40 is moved back by a can $a$, the rock shaft 41 is thereby partially rotated and the switch 50 is actuated to close the circuit through the solenoid 27. When, however, a can end $a'$ passes under the finger 44, as seen in Fig. 4, it swings said finger upward, thereby unclutching the clutch collar 43 from the arm 40, and permitting the arm 40 to be swung idly by a can without effecting the switch 50.

The switches employed for controlling the circuits for the stopping mechanism of the two machines are preferably in the form of mercury switches in which a small quantity of mercury is contained in a tiltable closed tube formed of glass, or other non-conducting material, into one end of which are inserted terminals of the electric conductors.

Referring to Fig. 6, the electric switch 50, which controls the circuit for the solenoid 27 from the place indicated in Figs. 2 and 3, is shown as comprising a mercury tube 28 secured by clips upon an oscillatory support 49 fulcrumed upon the wall of the casing $50^a$ of the switch mechanism and connected to a lever 51 by a short shaft 52 journaled in the wall of the casing $50^a$. The normal position of the mercury tube of the switch is in the inclined position, seen in Fig. 7, wherein the body of mercury is contained in the lower end of the tube 28 and out of contact with the terminals of the electric circuit for the solenoid 27. The circuit is closed by partially rotating the mercury tube to bring the mercury into contact with the terminals. Another mercury tube 92 is mounted on the support 49, and this mercury tube is employed in the circuit for the solenoid 27 which is controlled by the switches 33 and 36.

The lever 51 of the switch 50 is connected to an arm 53 mounted on a rock shaft 41 by a link 54, whereby whenever said rock shaft 41 is moved as a result of a can passing the arm 40 without a can top having been supplied thereto, the mercury tube is swung over into an inversely tilted position, in which position the mercury makes contact between the two terminals of the electric circuit for the solenoid 27. A counterweighted arm 55 is preferably provided upon the lever 51 to return the parts to normal position, after the arm 40 has been released from a can. The circuit for the solenoid 27 which is controlled by the mercury switch tube 28, may be traced in Fig. 16 from the main line 56 (in which is contained a switch S), the branch conductor 56ᵇ, the mercury switch tube 28 (wherein the circuit is open), conductors 91ᵃ, 91, the mercury switch tube 90ᵃ (wherein the circuit is closed), conductors 93 and 57, the solenoid 27 and the conductor 58 of the main line. It will be understood that the circuit is normally open in the mercury switch tube 28, but that when said switch tube is reversely tilted, the solenoid 27 is energized and the clutch of the clinching machine is thrown into stopping position.

As is customary, the main driven shaft 20 (see Fig. 9) of the clinching machine is provided with a clutch 21 for clutching it to the driven shaft, and the clutch lever 22 thereof is connected to the stem 23 of a plunger 24 (see Fig. 10) of a pneumatic cylinder 25. The valve mechanism 26 for the vacuum cylinder is operatively connected to the solenoid 27. The solenoid is contained in the electric circuit which is controlled by the mercury switch tube 28. As is customary, a hand lever 22ᵃ is provided for manually operating the clutch 21.

The clutch throwing mechanism may be of any suitable form; and is here shown as comprising one operating under the influence of vacuum. From the cylinder 25 leads a vacuum pipe 59 (see Figs. 10 and 11) to a suitable suction pump (not shown) and the inlet passage 62 in the cylinder body leads to a valve chamber 60 controlled by a valve 61 and enters the cylinder through a passage 62ᵃ. The valve 61 is connected to the core 63 of the solenoid 27 by a valve stem 64 and a bell crank lever 65. When the solenoid is energized, the valve is shifted to place the cylinder 25 in communication with the vacuum supply, and the clutch mechanism is thrown thereby stopping the machine. A tension spring 66 connects the bell crank lever 65 with some stationary portion of the cylinder and serves to return the valve to normal position after the solenoid 27 has been deenergized.

To prevent the clinching machine from feeding filled cans to the vacuumizing and seaming machines in the event that the supply of the can ends in the can end stack becomes exhausted, circuit closing mechanism is provided in connection with the stack of can ends, which circuit closing mechanism remains inactive until the supply of can ends is almost exhausted, whereupon said circuit closing mechanism is actuated to close the circuit to the solenoid 27 of the clutch throwing mechanism for the clinching machine. Said circuit closing mechanism is made the subject matter of a separate application, filed May 24, 1930, Serial No. 455,432 and its construction is more fully set forth in said application.

Briefly, the circuit closing mechanism 94 for the stack of can ends comprises a finger 94ᵃ (see Figs. 1 and 12) which is normally held against the edges of the can ends in the stack by a counterweighted arm 96, and said finger is connected to a tiltable mercury tube 90 (see Fig. 16), in one end of which are the terminals of conductor 56 and branch 93 of conductor 57 which leads to the solenoid 27. In the operation of the circuit closing mechanism 94, the finger 94ᵃ is held back by the stack of can ends, and when the finger is released by said can ends, it is moved by the counterweighted arm, thereby tilting the mercury tube 90 into a reversely tilted position in which contact is made between the terminals therein of the solenoid circuit and the solenoid 27 is energized, and, as a result, the clutch operating mechanism for the clinching machine is actuated.

Associated with said mercury tube 90 is a companion mercury tube 90ᵃ, in one end of which are the terminals of conductors 93 and 91 for circuits controlled by the safety switch 33 and the vacuum switch 36. The gap in the mercury tube 90ᵃ is normally closed by the mercury in the tube. It will be observed that so long as the clinching machine is in operation, the circuit for the solenoid 27 through the tube 90ᵃ is closed in said tube, so that if the circuit is completed through the safety switch 33 or the vacuum switch 36, the solenoid 27 will be energized, but in case the mercury tubes 28, 92 or 90 and 90ᵃ have been tilted and the clinching machine has been stopped, then in the event the circuit is completed by the safety switch 33 or vacuum switch 36, the circuit through the solenoid 27 will remain open because of the break in the mercury tube 92 or 90ᵃ.

As has already been explained, the vacuumizing and seaming machine B (see Fig. 1) is provided with mechanism for moving the filled cans with the ends thereon to and through the vacuum chamber 31 and with seaming mechanism which seams the can ends to the can bodies. This mechanism is driven from any suitable source of power, and is here shown as provided with a belt pulley 67 mounted upon a drive shaft 68 which may be clutched to or unclutched from a main driven shaft of the seaming mechanism by the clutch mechanism 35 (see Fig. 13). The clutch mechanism engages with a reciprocating rod 69 to effect the clutching and unclutching of the drive shaft 68 with the main driven shaft of the machine.

A clutch lever 70 is provided for manually operating the clutch mechanism 35. The clutch mechanism is also operated by a pneumatic cylinder and plunger substantially of the character shown in Fig. 10, and said cylinder is illustrated at 71 (see Fig. 13). The valve 72 for controlling the vacuum supply to the cylinder of the pneumatic clutch throwing mechanism is, however, interposed in a vacuum supply pipe 73, and the valve stem 74 of said valve is arranged to be actuated by the core 75 of the solenoid 34 and an interposed arm 76 (see Fig. 14).

It will be understood that when the solenoid 34 is energized, the core 75 is moved endwise, thereby swinging up the arm 76 and moving the valve stem 74 in an endwise direction, thus unseating the valve. It will also be understood that when the cylinder 71 of the pneumatic mechanism is thus subjected to the influence of vacuum, the plunger therein will be moved back, thereby actuating the clutch mechanism 35 and unclutching the drive shaft 68 from the main driven shaft of the operating mechanism of the vacuumizing and seaming machine B.

The vacuum pipe 73 for the cylinder 71 connects with the main vacuum pipe 77 (see Fig. 1) which leads from the vacuum chamber 31 of the vacuumizing and seaming machine to the vacuum pump or source of vacuum supply. The circuit for the solenoid 34 is controlled by the switch 33 contained in the chamber 30 of the vacuumizing and seaming machine and also by the vacuum switch 36.

The vacuum switch 36 is of conventional form and communicates with the interior of the vacuum chamber 31 by a vacuum pipe 78 (see Fig. 15). The switch mechanism includes a tiltable mercury tube 79 carried by a tube supporting member 80 fulcrumed on the box or container 36ª of the vacuum switch 36, as at 81, and connected to the switch mechanism by a link 82. Fig. 15 shows the mercury tube 79 in the position occupied when the vacuum in the vacuum chamber 31 is normal. In case the vacuum supply fails or is diminished, the mechanism of the vacuum switch operates to move the link 82 upward, thereby tilting the mercury tube 79 into a reversely inclined position with respect to that seen in Fig. 15, thus closing the circuit for the solenoid 34, which being energized, opens the valve 72 and places the cylinder of the pneumatic clutch throwing cylinder 27 under the influence of the vacuum, whereby the clutch mechanism is actuated and the operating mechanism of the vacuumizing and seaming machine is stopped.

The circuit for the solenoid 34 controlled by the vacuum switch 36 may be traced from the main line 56 (see Fig. 16) through the branch conductor 83, the mercury tube 79, (where the circuit is open), conductor 84, contact member 85 of the double throw switch 39, and conductors 86 and 89 to the solenoid 34, and the conductor 88 back to the main line 58. As long as the mercury tube 79 remains in the position shown in Figs. 15 and 16, the circuit to the solenoid 34 remains broken at the mercury tube 79, since the mercury at that time is contained in the lower end of the tube and out of contact with the terminals for the conductors 83 and 84 that are contained in the mercury tube. When, however, the vacuum fails or is reduced materially, the vacuum switch mechanism 36 operates to tilt the mercury tube 79 into a reversely inclined position, whereby the mercury makes contact with the terminals of the conductors 83 and 84, thereby closing the circuit for the solenoid 34, and, as a result, causing the clutch mechanism 35 to be thrown, thereby stopping the vacuumizing and seaming machine. When a maloperation occurs in the vacuum chamber 30 of the vacuumizing and seaming machine, the switch 33 is closed, its circuit for the solenoid 34 may be traced in Fig. 16, from the main line 56, through branch conductor 56ª, safety switch 33, branch conductor 89ª, conductor 89, 89, solenoid 34 and back through conductor 88 to the main line 58.

As has been explained, whenever the vacuumizing and seaming machine stops it is necessary to stop the operation of the clinching machine to prevent more filled cans from being fed to the vacuumizing and seaming machine, and to accomplish this result, the solenoid 27 of the stopping mechanism for the seaming machine is arranged in a circuit which is closed by the safety switch 33 or the vacuum switch 36, whenever either of said switches is actuated. The circuit for the solenoid 27 which is controlled by the switch 33 may be traced from the main line 56 through branch conductor 56ª, the safety switch 33, branch conductor 89ª, conductor 89, mercury tube 92, conductors 91ª and 91, mercury tube 90ª, branch 93, conductor 57, solenoid 27 and back through the main line 58. The circuit for the solenoid 27 which is controlled by the vacuum switch 36 may be traced from the main line 56 through the branch conductor 83, the mercury switch tube 79, (where the current is normally open), conductor 84, contact member 85 of the switch 39, the conductor 86, conductor 89, mercury tube 92, conductors 91ª and 91, mercury tube 90ª, conductors 93 and 57 to the solenoid 27 and thence back through the main line 58.

As has already been explained, when the vacuumizing and seaming machine is in operation, the incandescent lamps 37 and 38 remain illuminated, but that whenever the vacuum fails in the vacuum chamber, the lights are extinguished, thereby notifying the attendant that the vacuum has failed. The circuit for the lamps 37 and 38 may be traced in Fig. 16 from the main line 56 through the conductor 83 and branch 83ª thereof through the mercury tube 79 (where the circuit is closed), conductor 97, contact piece 98 of the double throw switch 39, conductor 99 and through the lamps 37 and 38, thence through a conductor 100 to the main line 58. Whenever the vacuum fails and the mercury tube 79 is tilted into a reversely inclined position, the circuit is broken between the terminals of the conductors 83 and 97 in the mercury tube 79 and the lights are extinguished.

In order that the vacuum chamber of the vacuumizing and seaming machine may be illuminated while the attendant is restoring the parts to normal position, the switch 39 is made in the form of a double throw switch, so that when moved into the position indicated in dotted lines in Fig. 16, the circuit for the lamps 37 and 38 may be restored and this circuit may be traced from the main line 56 through the conductors 83 and 84 to the pressure switch 36 (where the circuit has been closed by the mercury tube 79), the contact member 85 of the double throw switch 39, conductor 99 through the lamps and back through the conductor 100 to the main line 58. When the vacuum has again become effective, the mercury switch 79 is tilted back to the normal position indicated in Figs. 15 and 16, thereby extinguishing the lights, and the attendant thereupon throws the double throw switch back to its normal position, thereby closing the circuit for the lamps.

The operation of the control mechanism has been explained in connection with the description of the mechanism and the electric circuits. Normally the switches 50, 94, 33, 36 and 39 are in the positions illustrated in the drawings. As long as a can end is fed to each can in the clinching machine, the circuit for the solenoid 27 remains open in the tube 28 of the switch 50 and as long as the required number of can ends are contained in the stack, the circuit for the solenoid remains open in the tube 90 of the mercury switch 94. However, in case a filled can is fed through the clinching machine without being supplied with a can end, the mercury switch 50 is tilted into a reversely inclined position, whereby the circuit for the solenoid 27 is closed through the mercury tube 28 of that switch. Similarly, if the supply of can ends becomes almost exhausted, the mercury switch 94 is tilted into a reversely inclined position, thereby closing the circuit for the solenoid through the mercury tube 90 of the switch 94. When the solenoid 27 is energized from either of these points, the clutch mechanism of the clinching machine is thrown, thereby stopping said machine without effecting the operation of the vacuumizing and seaming machine.

In case of a mal-operation taking place in the vacuum chamber of the vacuumizing and seaming machine, the circuits for the solenoids 27 and 34 are closed through the safety switch 33, and when the vacuum chamber fails, the vacuum switch 36 is actuated, thereby tilting the mercury tube 79 thereof into a reversely inclined position and closing the circuits through the solenoids 27 and 34, and, at the same time, breaking the circuits for the lamps 37 and 38. By thus closing the circuits for the solenoids 27 and 34, they are energized and the clutch mechanism of the clinching machine and the vacuumizing and seaming machine are actuated to throw the clutches and thereby stop both of said machines. The circuits through the lamps 37 and 38 may be closed by throwing the double throw switch 39 and after the adjustments or repairs have been made, the machines are started by manually throwing the clutch levers for the clutch mechanism thereof, after which the double throw switch is thrown back into its normal position.

While the control mechanism has been shown and described as applied to associated can clinching machines and can closing machines, it is to be understood that the use of the invention is not limited to such machines as it is equally applicable to other automatically operating machines embodying a plurality of independently operating mechanisms wherein operations upon an article are made in succession.

I claim as new, and desire to secure by Letters Patent:

1. In automatic machines wherein articles are fed from one operating mechanism to another and each are operated on by said mechanisms in succession, control mechanism therefor comprising an individual stopping element for each operating mechanism, means responsive to mal-operations in one of said operating mechanisms for actuating the stopping element of an associated operating mechanism, and means responsive to mal-operations in the other operating mechanism for actuating both of said stopping elements.

2. In automatic machines wherein articles are fed from one operating mechanism to another and each are operated on by said mechanisms in succession, control mechanism therefor, comprising clutch throwing elements, one for each operating mechanism, and including an electro magnetic device, a circuit closing member for the circuit of each electric magnetic device associated with each operating mechanism and responsive to mal-operations occurring in an associated operating machine, one of said circuit closing members being in the circuits of both of said electro magnetic devices, and means associated with each operating mechanism for actuating an associated circuit closing element, said last mentioned actuating means being responsive to mal-operations occurring in their associated operating mechanism.

3. In automatic machines wherein articles are fed from one operating mechanism to another and successive operations are performed on each article by said mechanisms.

control mechanism therefor comprising a clutch throwing element for each operating mechanism for stopping said mechanism, means responsive to mal-operations in the operating mechanism associated with the clutch throwing element of one of said mechanisms for throwing the clutch thereof without throwing the clutch of the other mechanism.

4. Control mechanism for a clinching machine and an associated can closing machine to which can bodies with can ends thereon are fed from the clinching machine, comprising clutch operating mechanism, one for each machine and including an electro magnetic device for setting the clutch operating mechanism into operation, circuit closing members, one associated with each operating mechanism, for closing a circuit for an associated electro magnetic device, the circuit closing device of the can closing machine also being contained in the circuit for the electro magnetic device of the clinching machine, and means responsive to mal-operations of said machines for actuating the circuit closing members associated with the respective machines.

5. Control mechanism for a clinching machine and an associated can closing machine to which cans with ends thereon are fed from the clinching machine, comprising pneumatically operated clutch throwing mechanisms, one for each machine and including an electro magnetic device for controlling the operation of the clutch throwing mechanism, circuit closing members, one associated with each machine, for closing a circuit through an associated electro magnetic device, the circuit closing member of the can closing machine also being contained in the circuit for the electro magnetic device of the clinching machine, and means responsive to mal-operations of said machines for actuating the circuit closing members of the respective machines.

6. Control mechanism for a clinching machine and an associated can closing machine to which can bodies with ends thereon are fed from the clinching machine, comprising pneumatically operated clutch operating mechanisms, one for each machine and including a solenoid for controlling the operation of the clutch throwing mechanism, circuit closing members, one associated with each machine, for closing a circuit for an associated solenoid, the circuit closing element of the can closing machine also being contained in the circuit for the solenoid of the clinching machine, and means responsive to mal-operations of said machines for actuating the circuit closing members of the associated machine.

7. Control mechanism for a clinching machine and an associated can closing machine to which can bodies with ends thereon are fed from the clinching machine, comprising pneumatically operated clutch operating mechanisms, one for each machine and including a solenoid for controlling the operation of the clutch throwing mechanism, circuit closing members, one associated with each machine, for closing a circuit for an associated solenoid, the circuit closing element of the can closing machine also being contained in the circuit for the solenoid of the clinching machine, and can actuated means responsive to mal-operations of said machines for actuating said circuit closing members.

8. Control mechanism for a clutching machine and an associated can closing machine to which filled can bodies with ends thereon are fed from the clinching machine, comprising clutch throwing mechanism for each machine, each clutch throwing mechanism including an electro magnetic device for controlling the operation of the circuit throwing mechanism, circuit closing members, one associated with each machine and responsive to mal-operations occurring in an associated machine, the circuit closing member of the clinching machine being contained in a circuit for the electro magnetic device associated with the clutch throwing mechanism of the clinching machine, and the circuit closing member of the can closing machine being contained in the circuits for the electro magnetic devices of the clutch throwing mechanisms of both machines, said circuit closing means being responsive to mal-operations occurring in the respective machines.

9. Control mechanism for a clinching machine through which filled cans are fed and upon which can ends are placed, and an associated can closing machine to which the filled cans with the tops thereon are fed from the clinching machine, comprising clutch operating mechanism, one for each machine and including an electro magnetic device for controlling the operation of the associated clutch throwing mechanism, electric switches, one associated with each machine, for closing a circuit to an associated electro magnetic device, and switch actuating means for the switch of the clinching machine, said switch actuating means being operated by uncovered filled cans.

10. Control mechanism for a clinching machine through which filled cans and can tops are fed, and an associated can closing machine to which said filled cans with the tops thereon are fed from the clinching machine, comprising clutch operating mechanisms, one for each machine and including an electro magnetic device for controlling the operation of the clutch operating mechanism, circuit closing members, one associated with each machine for closing a circuit through an associated electro magnetic device, the circuit closing member of the can closing machine also being contained in the circuit for the electro magnetic device of the clinching machine, and means responsive to mal-operations of said machines for actuating said circuit closing means thereof, said last mentioned means, which is associated with the clinching machine, being operated by the filled uncovered can bodies that pass through the clinching machine.

11. Control mechanism for a clinching machine and an associated vacuumizing and seaming machine having a vacuum chamber through which can bodies with tops thereon are fed from the clinching machine, comprising clutch operating mechanisms, one for each machine and including an electro magnetic device for controlling the operation of the clutch throwing mechanism, a can operated switch associated with the clinching machine for closing a circuit through the electro magnetic device associated with the clutch throwing mechanism of the clinching machine, and a vacuum switch responsive to variations of pressure in the vacuum chamber of the vacuumizing and seaming machine for closing the circuits to the electro magnetic devices of both machines.

12. Control mechanism for a clinching machine and an associated vacuumizing and seaming machine having a vacuum chamber through which can bodies with tops thereon are fed from the clinching machine, comprising clutch operating mechanisms, one for each machine and including an electro magnetic device for controlling the operation of the clutch throwing mechanism, and circuit closing members, one associated with each machine for closing a circuit for an associated electro magnetic device, the circuit closing device of the vacuumizing and seaming machine also being contained in the circuit for the electro magnetic device for the clinching machine, and actuating mechanism for both of said circuit closing members, the actuating mechanism of the vacuumizing and seaming machine including a vacuum switch responsive to variations of pressure in the vacuum chamber of the vacuumizing and seaming machine.

13. Control mechanism for automatic machinery containing individual operating mechanisms for performing successive operations on articles, comprising stopping mechanism for each individual operating mechanism, including an electro magnetic device, electric switch mechanism, associated with the operating mechanism which performs the last of the successive operations on the articles, for closing circuits to both of said electro magnetic devices, said electric switch mechanism being responsive to mal-operations in said last mentioned operating mechanism.

14. Control mechanism for automatic machinery containing individual operating mechanisms for performing successive operations on articles, comprising stopping mechanism for each individual operating mechanism, including an electro magnetic device, a vacuum switch, associated with the operating mechanism which performs the last of the successive operations on the articles, for closing circuits to both of said electro magnetic devices, said vacuum switch being responsive to variations of pressure in said last mentioned operating mechanism.

15. In control mechanism for a can clinching machine and an associated can closing machine to which cans with covers thereon are fed from the clinching machine, the combination of electrically controlled pneumatically operating clutch throwing mechanism for each machine, electric switch mechanism associated with each machine, the switch mechanism for the clinching machine being arranged to control the circuit for the electro magnetic element of the switch throwing mechanism of the clinching machine and the switch mechanism for the can closing machine being arranged to close the circuits for the electro magnetic devices of both clutch throwing mechanisms, switch actuating mechanism associated with the clinching machine having means actuated by an uncovered can body for throwing the switch, and the switch actuating mechanism for the can closing machine being pneumatically operated.

16. In control mechanism for a clinching machine and an associated can closing machine to which cans with ends thereon are fed from the clinching machine, the combination of electrically controlled pneumatically operated clutch throwing mechanism for each machine, can actuated switch mechanism associated with the clinching machine for closing the circuit to the electro magnetic device of the clutch throwing mechanism thereof, and a mechanically operated switch and a pneumatically operated switch, both associated with the can closing machine and arranged to close circuits for the electro magnetic devices of both machines.

17. In a vacuumizing and seaming machine having a vacuum chamber, electric lamps therein, and a clutch throwing mechanism including an electro magnetic device, control mechanism for said lamps and electro magnetic device, comprising a vacuum switch in the circuits for the lamps and the electro magnetic device, said vacuum switch being responsive to variations of pressure in the vacuum chamber, and a manually operated switch in the circuit for the electric lamps whereby the circuit to the lamps may be independently controlled.

18. In a vacuumizing and seaming machine having a vacuum chamber, electric lamps therein, and clutch throwing mechanism including an electro magnetic device, control mechanism for said lamps and electro magnetic device comprising a vacuum switch connected with said vacuum chamber and responsive to variations of pressure therein, said vacuum switch normally forming a closed circuit for said lamps and an open circuit for the electro magnetic device of the clutch throwing mechanism and operating to break the circuit to the lamps and close the circuit to the electro magnetic device when an abnormal condition arises in the vacuum chamber, and a manually operated switch in the circuit for the lamps, whereby the circuit to the lamps may be closed when broken by the vacuum switch.

In testimony whereof, we affix our signatures.

HENRY A. FINK.
JOHN E. SCHMIDT.